Aug. 26, 1969
R. C. BASTIEN ET AL
3,463,574
MULTILAYER ANTIREFLECTION COATING FOR
LOW INDEX MATERIALS
Filed June 26, 1967
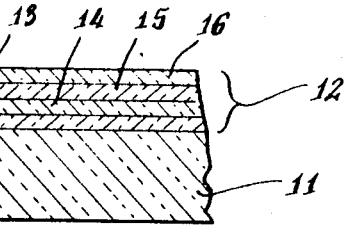
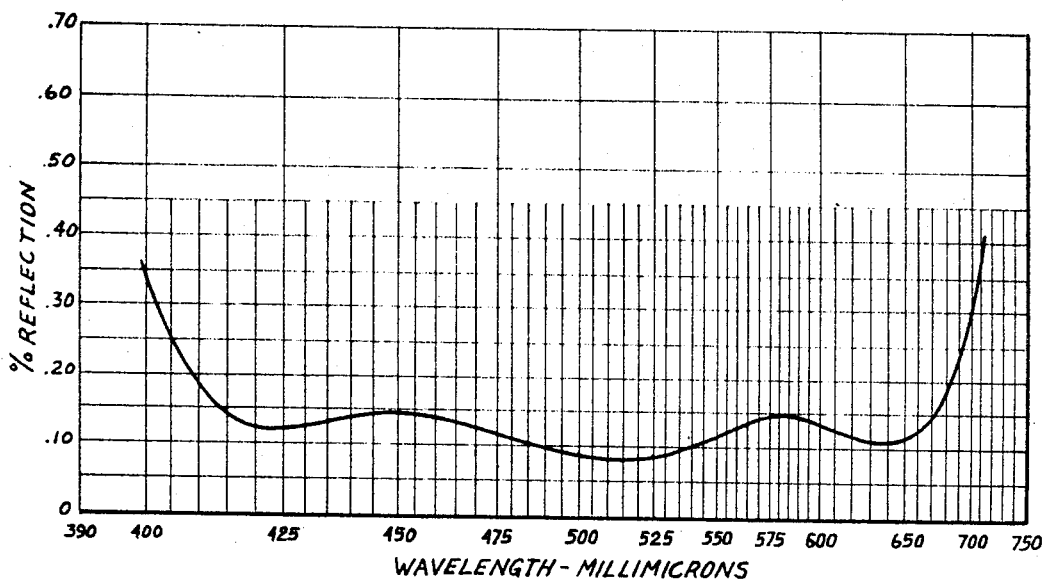
INVENTORS
Roy C. Bastien
Richard J. Scheuerman
BY
Irving M. Kriegsman
ATTORNEY.

United States Patent Office 3,463,574
Patented Aug. 26, 1969

3,463,574
MULTILAYER ANTIREFLECTION COATING
FOR LOW INDEX MATERIALS
Roy C. Bastien, Redding, and Richard J. Scheuerman, Danbury, Conn., assignors to The Perkin-Elmer Corporation, Norwalk, Conn., a corporation of New York
Filed June 26, 1967, Ser. No. 648,658
Int. Cl. G02b 1/10, 5/28
U.S. Cl. 350—164  7 Claims

ABSTRACT OF THE DISCLOSURE

A coating for reducing unwanted reflection off a surface of a transparent body having a low index of refraction. The coating is made up of four homogeneous layers of dielectric materials. Each layer has an optical thickness of one-quarter of the design wavelength. The index of refraction of the transparent body and the four layers are numerically related as follows:

$$N_4 < N_s < N_1 < N_3 < N_2$$

where $N_s$ is the index of refraction of the transparent body and $N_1$ through $N_4$ are the indices of refraction of the layers in the order in which they are deposited on the transparent body.

---

This invention relates to antireflection coatings. More particularly this invention relates to a high performance multilayer antireflection coating for use with transparent materials having a low index of refraction. As used in the art, the term "low index of refraction" refers to an index of refraction of less than about 2.0. An example of such a material is crown glass which has an index of refraction of about 1.5.

Antireflection coatings are now well known and are extensively used today on the surfaces of lenses, windows and other transparent optical elements to reduce unwanted reflection. Generally it is desirable that they reduce the surface reflectance to an extremely low value over an extended spectral region so as to maintain proper color balance and to be most efficient.

Several different types of antireflection coatings have been developed for use with low index materials (substrates). One type consists of a single layer of material, another type is made up of two layers, another type consists of three layers, and still another type is made up of four different layers. Antireflection coatings having more than four layers also exist but are usable only with high index materials such as germanium.

The following is a list of some of the pertinent published reference material on antireflection coatings: (1) U.S. Patent No. 2,478,385; (2) U.S. Patent No. 3,185,020; (3) an article entitled "Triple Layer Antireflection Coatings on Glass for the Visible and Near Infrared," Journal of the Optical Society of America, vol. 52, No. 9, September 1962, pp. 965–969; (4) an article entitled "On the Evaporation of Two Component Dielectric Thin Films for Reflection-Reducing Coatings and Interference Filters," Japanese Journal of Applied Physics, Proceedings of the Conference on Photographic and Spectroscopic Optics, 1964, vol. 4, Supplement 1, 1965, pp. 333–339; (5) a book entitled "Physics of Thin Films," vol. 2, 1964, Academic Press, New York, pp. 239–304.

Each of the hitherto developed antireflection coatings as well as their advantages and limitations are described in detail in the above cited book entitled "Physics of Thin Films." Basically the single layer coatings will reduce reflectance on a low index material such as crown glass from 4 to about 1.2% over a moderate spectral range. The double layer coatings which exist in several different versions, i.e. different combinations of thicknesses and indices of refraction for the layers, will reduce reflectance to about zero but only over one or two very narrow reflectance minima. Several different versions of three layer coatings have been developed. One such three layer coating is described in U.S. Patent 3,185,020 and, as stated therein, will reduce the reflectance below 1% across the visible spectrum from 400 millimicrons to 700 millimicrons and below .3% from 425 millimicrons to 600 millimicrons. One version of a four layer coating has been developed for use with low index materials and consists of a first layer having an index of refraction of 1.38 and an optical thickness of a quarter wavelength, a second layer having an index of refraction of 1.548 and having an optical thickness of one-quarter wavelength, a third layer having an index of refraction of between 1.8 and 2.35 and an optical thickness of one-half wavelength, and a fourth layer having an index of refraction of 1.38 and an optical thickness of one-quarter wavelength. This coating will produce three low reflectance minima.

It should be noted that throughout this specification and the claims the layer designated as the first layer is the inner layer (i.e. the layer deposited adjacent to the substrate), and that the subsequently deposited layers are designated as the second and third etc. in that order. Thus, the outer layer will have the largest number.

It is an object of this invetnion to provide a new and improved antireflection coating.

It is another object of this invention to provide a new and improved antireflection coating for use on transparent optical elements having a low index of refraction.

It is still another object of this invention to provide a new and improved antireflection coating for use on low index materials which will reduce reflection below 0.5% over a wide band of wavelengths in the visible frequency range.

It is yet another object of this invention to provide a new and improved antireflection coating for use on optical materials having an index of refraction between 1.51 and 1.75 and which can be made from commercially available materials.

The above and other objects are achieved by constructing an antireflection coating which is made up of four layer or films. Each layer has an optical thickness of one-quarter wavelength. The first layer (next to the substrate) has an index of refraction of between 1.72 and 1.89. The second layer has an index of refraction of between 2.15 and 2.20. The third layer has an index of refraction of between 2.00 and 2.10 and the fourth layer (furthest from the substrate) has an index of refraction between 1.38 and 1.45. The coating is applied to a substrate having an index of refraction between 1.51 and 1.75.

For substrates having an index of refraction of less than 1.51, i.e. 1.45 to 1.51, the range of values for the first layer is lowered, whereas the range of values for the second and third layers is raised and the range of values for the fourth layer stays the same.

Various other features of the invention will become apparent on reading the following detailed description when taken in conjunction with the drawings in which:

FIGURE 1 is an enlarged section view of a substrate provided with an antireflection coating constructed according to this invention; and FIGURE 2 is a graph showing the reflectance of a typical antireflection coating constructed according to this invention.

Referring now to FIGURE 1, there is shown a substrate designated by reference numeral 11 in which is deposited an antireflection coating designated by reference numeral 12. The coating 12 consists of a first layer 13, a second layer 14, a third layer 15 and fourth layer 16. Inner layer 13, as can be seen, is adjacent to the substrate 11. Each layer 13 through 16 has an optical thickness of one-quarter of a wavelength.

As is well known to those skilled in the art, the optical thickness is the physical thickness multiplied by the index of refraction of the material. The optical thickness of the layer is normally described in fractions of wavelengths of the light for which the coating is to be used. Each coating has a design wavelength and the optical thickness is specified as a fraction of this design wavelength.

The indices of refraction of the four layers and the substrate are numerically related as follows:

$$N_4 < N_s < N_1 < N_3 < N_2$$

where $N_s$ is the index of refraction of the substrate 11, $N_1$ is the index of refraction of the first layer 13 and $N_2$, $N_3$ and $N_4$ are the indices of refraction of layers 14, 15 and 16 respectively.

With the substrate 11 having an index of refraction between 1.51 and 1.75, layer 13 has an index of refraction between 1.72 and 1.89, layer 14 has an index of refraction between 2.15 and 2.20, layer 15 has an index of refraction between 2.00 and 2.10 and layer 16 has an index of refraction between 1.38 and 1.45.

It should be noted that this coating will reduce the reflectance of a single surface to less than about 0.5% in the visible spectrum. The coating had a bandwidth ratio of 2:1 with the bandwidth being defined as the highest wavelength where the reflection does not exceed 0.5% divided by the lowest wavelength where the reflection does not exceed 0.5%.

Generally, as the refractive index of the substrate increases (i.e. from 1.51 to 1.75), the required value of the refractive index of the first film will increase (i.e. from 1.72 to 1.89), the required value of the refractive index of the second film will decrease, the required value of the refractive index of the third film will decrease, and the required value of the refractive index of the fourth film will remain unchanged.

Also, it may generally be stated that, as the bandwidth increases (for a substrate having a specific index) the required value of refractive index of the first film will increase, the required value of the refractive index of the second film will increase, the required value of the refractive index of the third film will decreases, and the required value of the refractive index if the fourth film will increase.

The following is a table of the particular values of the index of refraction of each layer for three different examples (substrates). In the table $N_s$ stands for the index of refraction of the substrate, and $N_1$ through $N_4$ stand for the index of refraction of the first through fourth layers respectively, the first layer being the layer adjacent the substrate etc.:

| Example | $N_s$ | $N_1$ | $N_2$ | $N_3$ | $N_4$ |
|---|---|---|---|---|---|
| 1 | 1.51 | 1.73 | 2.19 | 2.07 | 1.38 |
| 2 | 1.62 | 1.80 | 2.18 | 2.04 | 1.38 |
| 3 | 1.75 | 1.89 | 2.17 | 2.01 | 1.38 |

Any of the well-known dielectric materials having the required index of refraction or mixtures thereof which will produce the desired index of refraction may be used on all the different layers. The coating may be deposited on the substrate by any of the well-known techniques such as evaporation in a high vacuum, vapor deposition and reactive sputtering.

For example, all four layers may be formed by simultaneous controlled evaporation from two sources, with one source containing magnesium fluoride having an index of refraction of 1.38 and the other source containing zinc sulfide having an index of refraction 2.26. Thus the first three layers may comprise mixtures of magnesium fluoride and zinc sulphide and the fourth layer may comprise simply magnesium fluoride.

Referring now to FIGURE 2, there is shown a reflectance curve of Example No. 1 in the above table. The ordinate of the graph is in percent reflectance and the abcissa is in wavelength in millimicrons. It should be noted that ordinate is scaled from zero to seven-tenths of one percent. As can be seen the reflectance is less than 0.3% from about 403 to about 700 millimicrons. The curve shown is the reflectance obtained from the coating when observed at an angle normal to the surface.

What is claimed is:

1. An antireflection coating for use in reducing light reflection off the surface of a transparent body having an index of refraction of $N_s$, said coating comprising four layers of dielectric material, each layer having an optical thickness of one-quarter of a preselected design wavelength and wherein the index of refraction of each layer and said transparent body are numerically related as follows:

$$N_4 < N_s < N_1 < N_3 < N_2$$

wherein $N_1$ through $N_4$ are the indices of refraction of the respective layers in order starting with the layer disposed closest to the transparent body.

2. In combination with a transparent body having a light reflecting surface and an index of refraction of less than about 2.0, an antireflection coating disposed on said surface for reducing light reflection, said antireflection coating comprising four layers of material, each layer having an optical thickness of one-quarter of the design wavelength and wherein the index of refraction of each layer and said transparent body are numerically related as follows:

$$N_4 < N_s < N_1 < N_3 < N_2$$

wherein $N_s$ is the index of refraction of the transparent body, and $N_1$ through $N_4$ are the indices of refraction of the respective layers in order starting with the layer disposed closest to the transparent body.

3. In combination with a transparent body having a light reflecting surface and having index of refraction in the range of 1.51 to 1.75, an antireflection coating deposited on said surface for reducing light reflection, said antireflection coating comprising a first layer of material deposited on said surface having an optical thickness of one-quarter of the design wavelength and an index of refraction in the range of 1.72 to 1.89, a second layer of material deposited on said first layer of material having an optical thickness of one-quarter of the design wavelength and an index of refraction in the range of 2.15 to 2.20, a third layer of material deposited on said second layer having an optical thickness of one-quarter of the design wavelength and having an index of refraction in the range of 2.00 to 2.10, and a fourth layer of material deposited on said third layer and having an optical thickness of one-quarter of the design wavelength and having an index of refraction in the range of 1.38 to 1.45.

4. The invention according to claim 3 and wherein each of said layers comprises a mixture of magnesium fluoride having an index of refraction of 1.38 and zinc sulfide having an index of refraction of 2.26 in the proportions necessary for producing the defined index of refraction.

5. The invention according to claim 3 and wherein said transparent body has an index of refraction of 1.51, said first layer has an index of refraction of 1.73, said second layer has an index of refraction of 2.19, said third layer has an index of refraction of 2.07 and said fourth layer has an index of refraction of 1.38.

6. The invention according to claim 3 and wherein said transparent body has an index of refraction of 1.62, said first layer has an index of refraction of 1.80, said second layer has an index of refraction of 2.18, said third layer has an index of refraction of 2.04 and said fourth layer has an index of refraction of 1.38.

7. The invention according to claim 3 and wherein said transparent body has an index of refraction of 1.75, said first layer has an index of refraction of 1.89, said second layer has an index of refraction of 2.17, said third layer has an index of refraction of 2.01 and said fourth layer has an index of refraction of 1.38.

References Cited

FOREIGN PATENTS 1,489,601  6/1967  France.

OTHER REFERENCES

Cox and Hass: "Antireflection Coatings," Physics of Thin Films, vol. 2, 1964, Academic Press, New York, pp. 272–275.

Young, L.: "Multiple Antireflection Films," Journal of the Optical Society of America, September 1961, pp. 967–974.

DAVID SCHONBERG, Primary Examiner

T. H. KUSMER, Assistant Examiner

U.S. Cl. X.R.

117—33.3; 350—166